United States Patent [19]
Von Loewis of Menar

[11] 3,787,095
[45] Jan. 22, 1974

[54] APPARATUS FOR UNLOCKING A BRAKE-LOCKED WHEEL

[75] Inventor: Alexander Von Loewis of Menar, Post Holzgerlingen, Germany

[73] Assignee: Robert Bosch GmbH, Stuttgart, Germany

[22] Filed: Feb. 13, 1973

[21] Appl. No.: 332,168

[30] Foreign Application Priority Data
Feb. 22, 1972 Germany............. P 22 08 182.9

[52] U.S. Cl................. 303/21 F, 188/195, 303/10, 303/22 R
[51] Int. Cl.............................................. B60t 8/02
[58] Field of Search.. 303/21 F, 21 AF, 22 R, 22 A, 303/10, 2, 13; 188/195

[56] References Cited
UNITED STATES PATENTS

| | | | |
|---|---|---|---|
| 3,410,612 | 11/1968 | Lepelletier | 303/22 A |
| 3,475,059 | 10/1969 | Klein | 188/195 |
| 3,747,990 | 7/1973 | Tanguy | 303/21 F |

Primary Examiner—Duane A. Reger
Assistant Examiner—D. C. Butler
Attorney, Agent, or Firm—Michael S. Striker

[57] ABSTRACT

A sensor senses the brake-locked condition of a wheel of a motor car, and actuates a control valve to discharge fluid from the cylinder of a brake-unlocking device whose piston operates an unlocking valve in a brake fluid supply conduit so that the supply of brake fluid to the brake is interrupted, while fluid is drawn out of the supply conduit for unlocking the respective wheel. The cylinder of the unlocking device is connected with the hydropneumatic springs supporting the car body on the wheel shaft, so that the unlocking valve is held open even if the pressure of the pump or of the accumulator of the hydropneumatic springs fails.

10 Claims, 1 Drawing Figure

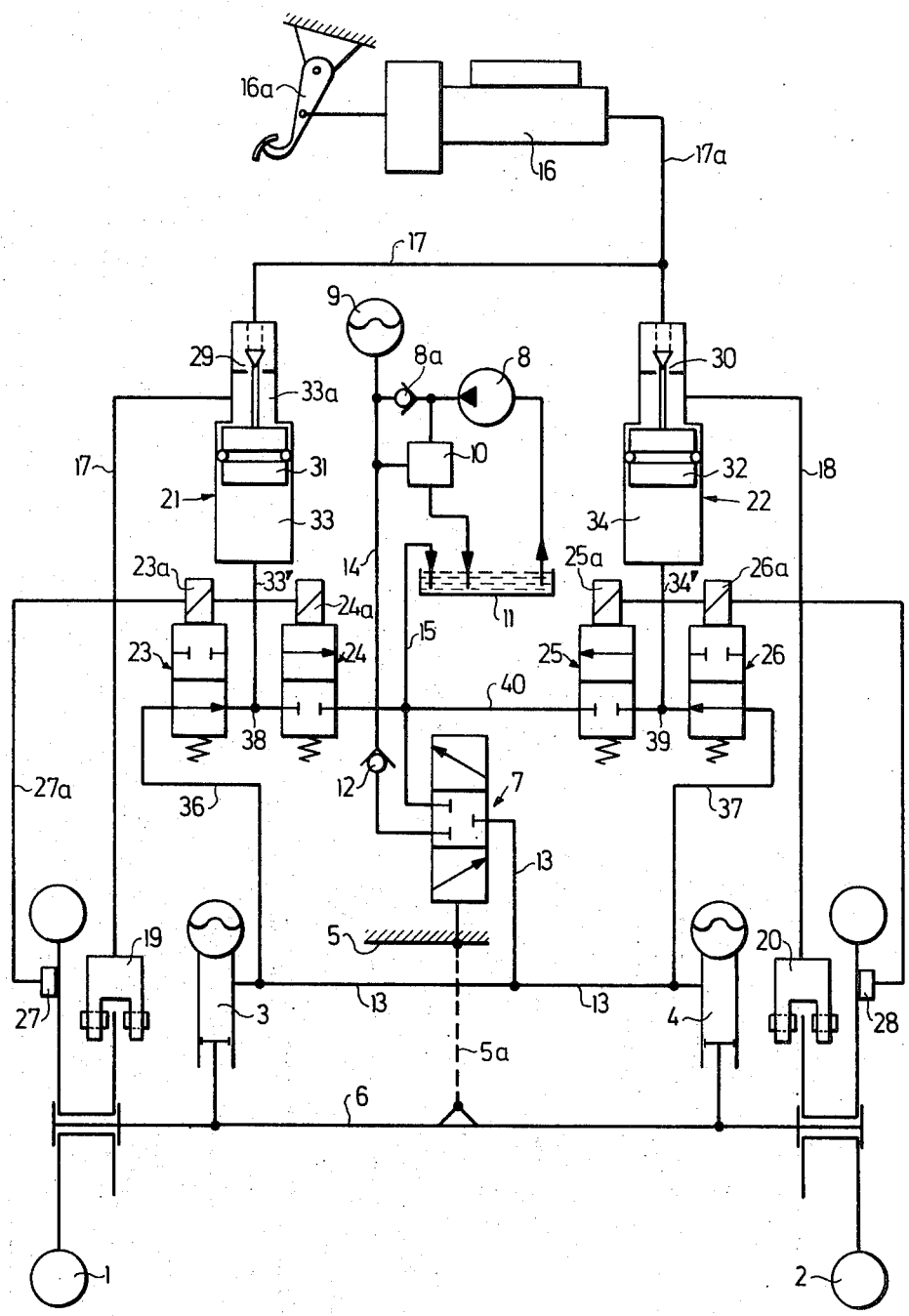

APPARATUS FOR UNLOCKING A BRAKE-LOCKED WHEEL

BACKGROUND OF THE INVENTION

The present invention relates to an apparatus for unlocking a brake-locked wheel of a car which is provided with hydropneumatic spring means. Apparatus of this type includes a pump, a pressure accumulator, a discharge container, a level regulating valve, and a hydraulic braking device which is provided with a sensor controlled brake-unlocking means. When a wheel is locked by too forceful application of the brake, a conduit between the brake-unlocking means and the wheel brake cylinder is closed, while another conduit to the discharge container is opened. The German OS 1,947,012 discloses an apparatus in which the brake is not disturbed when the pump supplying the pressure fluid fails. In the brake-unlocking means, an additional spring biased piston is used, which, in the event of failure of the pump or pressure fluid accumulator, places the brake-unlocking means in an open condition so that the brake conduit from the master cylinder to the wheel brake cylinder remains open.

SUMMARY OF THE INVENTION

It is the object of the invention to improve the apparatus of the prior art, and more particularly to assure in a simple manner the function of the brake-unlocking means of a vehicle with hydropneumatic springs, even if the source of pressure fluid means such as a pump or pressure fluid accumulator fails.

Another object of the invention is an apparatus for unlocking a brake-locked wheel without a special pump for the brake-unlocking means.

With these objects in view, the present invention connects the cylinder of a brake unlocking cylinder and piston means with pressure fluid from a hydropneumatic spring supporting a car body on the wheels so that the pressure in the unlocking cylinder is maintained even if the pump or other source of pressure fluid fails.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a schematic view illustrating a preferred embodiment of an apparatus for unlocking a brake-locked wheel of a car provided with hydropneumatic pressure fluid containing supporting means for the car body.

DESCRIPTION OF THE PREFERRED EMBODIMENT

A vehicle, such as a motor car, on which only a body 5 is schematically shown, is resiliently mounted on the shaft 6 of a pair of wheels 5 by means of hydropneumatic spring means 3 and 4 each including a piston secured to a shaft 6 and a cylinder secured to the car body, as schematically indicated by the broken line 5a. The cylinders of the spring means 3 and 4 are interconnected by a conduit 13 which is also connected to a level regulating valve 7 which, in accordance with the relative vertical displacement between the car body 5 and the wheel means 1, 2, 6, is shifted between two reversed positions connecting conduit 13 either with the pressure conduit 14, or with the discharge conduit 15 opening into a discharge container 11. In the intermediate position of the level regulating valve 7, conduit 13 is disconnected from both conduits 14 and 15.

A pump 8 supplies pressure fluid through a check valve 8a to the pressure conduit 14 which is connected with the pressure fluid accumulator 9, and contains a check valve 12 which opens toward the level regulating valve 7.

The motor car has a hydraulic brake apparatus including a master cylinder 16 and a master piston operated by a foot pedal 16a, or by another operator controlled means. The master cylinder 16 is connected by a conduit with two brake conduits 17 and 18 which are connected with brake cylinders 19 and 20 of the brake means acting on the wheels 1 and 2.

The hydraulic braking apparatus is provided with unlocking means 21 and 22 which serve the purpose of unlocking a wheel which is locked when too much brake force is applied by the brake.

Each unlocking means 21 and 22 includes a cylinder and an unlocking piston 31, 32 forming in the cylinder an unlocking chamber 33, 34. Each unlocking piston 31, 32 is connected with a valve 29, 30 which is disposed in the brake fluid supply conduit 17, 18 which connects the master cylinder 16 with the brake cylinders 19 and 20. Pairs 23, 24 and 25, 26 of electromagnetic control valves are provided with windings 23a, 24a connected with a sensor 27 on the wheel 1, and with windings 25a, 26a connected with sensor 28 on the wheel 2. Control conduits 26, 38, 33' and 37, 39, 34' connect the pressure conduit 13 between the hydropneumatic spring means 3 and 4, with the chambers 33 and 34 of the unlocking means 21 and 22. Conduits 36 and 37 can be opened and closed by control valves 23 and 26, and control valves 24 and 25 are connected by a discharge conduit 40 opening into discharge conduit 15. The conduits 33' and 34' are connected at a connecting point 38, 39 with conduits 36, 37 and 40 through the electromagnetic control valves 23 to 26.

The apparatus operates as follows:

The hydropneumatic spring system including the springs 3 and 4 between the shaft 6 and the car body 5, as indicated 5a a, operates in such a manner that, if the distance between the body 5 and the shaft 6 is varied, the level regulating valve 7 moves either to its lower position or to its upper position out of the open position which in the drawing. In the lower position of the level regulating valve 7, as shown in the drawing, the pump 8 and pressure conduit 14 are connected with conduit 13 and fluid is pressed into the hydropneumatic spring means 3 and 4 so that the car body 5 is raised.

When the valve is shifted to the upper position, as viewed in the drawing, the cylinders of the spring means 3 and 4 are connected by conduit 13 with the discharge conduit 15 so that pressure fluid is discharged into the discharge container 11, resulting in lowering of the car body 5.

During a normal brake operation, the unlocking valves 29 and 30 of the unlocking means 21 and 22, are open since the hydropneumatic cylinders 3 and 4 are connected by control conduits 36, 37, 33', 34' with the unlocking chamber 33, 34 so that the unlocking pistons 31, 32 are raised with the unlocking valves 29, 30. If the brake pressure in one brake conduit, for example 17, becomes so high that the wheel, for example wheel 1, is locked and does not turn, the sensor 27 senses the locked condition of the wheel in the usual manner, and shifts the electromagnetic valves 23, 24 to the respective other positions. The unlocking chamber 33 is disconnected from the control conduit 36, 33' through control valve 23, while control valve 24 connects discharge conduit 15 and discharge container 11 with the unlocking chamber 33 through conduit portion 33' so that the pressure is the unlocking chamber 33 is reduced, and piston 31 moves downward with unlocking valve 29 which interrupts the brake conduit 17 to that no brake fluid is supplied to the brake cylinder 19. At the same time, the unlocking piston 31 creates suction in the cylinder portion 33a so that the pressure in brake conduit 17 and in brake cylinder 19 is reduced, effecting unlocking of the brake wheel 1.

When wheel 1 turns again, the electromagnetic valves 23 and 24 and the unlocking means 21 return to the original positions of rest. In the same manner, wheel 2 is unlocked if locked by very high brake pressure.

The unlocking chambers 33, 34 of the unlocking means 21, 22 are normally, that is when no wheel is locked, subjected to the pressure of the hydropneumatic spring means 3 and 4. This assures that the brake conduits 17 and 18 are always open without requiring a special auxiliary pump or other source of pressure fluid for producing pressure in the unlocking chambers 33 and 34. The pressure of the hydropneumatic spring means 3 and 4 eliminates the necessity of providing a source of pressure for the unlocking means 21 and 22.

If pump 8 or pressure fluid accumulator 9 fails, the check valve 12 prevents a discharge of the pressure fluid from the spring means 3 and 4. The unlocking means 21 and 22 remain in the normal initial position, and the brake arrangement is not influenced by the failure of the pump 8. In a particularly advantageous modification of the ingention, four wheels are protected against locking by two circuits. In such an arrangement, two pressure accumulators and even two pumps would have to be provided, which is not necessary in the arrangement of the invention in which the entire two circuit, wheel unlocking apparatus can be operated by a single pump or other source of pressure fluid provided for the hydropneumatic spring system.

From the above disclousre, it becomes apparent that the present invention is concerned with the following combination of elements:

At least one wheel means 1; brake means for the wheel means 1 including a brake having a brake cylinder 19, a brake fluid supply conduit 17, 17a connected with the brake cylinder 19 so that locking of the wheel means by said brake means may occur; a body 5; hydropneumatic spring means 3 supporting the car body 5 on the wheel means 1, 6 and including a fluid filling spring chamber; a source of pressure fluid 8 with a pressure conduit means 14; discharge means 15, 11; a level regulating valve means 7 having first and second positions for connecting the spring chamber 3 with the pressure conduit means 14 and with the discharge means 15, respectively, depending on the relative displacement of the car body 5 and the wheel means 1, 6; unlocking means 21 for reducing the brake pressure including an unlocking cylinder 33, an unlocking piston 31 in the unlocking cylinder 33 forming an unlocking chamber, and an unlocking valve 29 located in the supply conduit 17 and being opened and closed by the unlocking piston 31; a control conduit 36, 33' connecting the spring chamber 3 with the unlocking chamber 33; sensor means 27 for sensing a condition of the wheel means 1 locked by the brake means 19; and control valve means 23, 24 in the control conduit 36 having a normal open position connecting the fluid filled spring chamber 3 with the unlocking chamber 33 so that that the unlocking piston 31 holds the unlocking valve 29 open even when the source 8 fails. The control valve 23, 24 is electromagnetically shifted to another position under the control of the sensor means 27 sensing a locked condition of the wheel means. In the other position, the control valve means connect the unlocking chamber 33 with the discharge means 15, 11 so that the unlocking piston 31 moves with the unlocking valve means 29 to close the supply conduit 17 while the unlocking piston 31 draws fluid out of the brake cylinder 19 whereby the wheel means 1 is unlocked.

It will be understood that each of the elements described above, or two or more together, may also find a useful application in other types of apparatus for unlocking a brake-unlocked wheel differing from the type described above.

While the invention has been illustrated and described as embodied in an apparatus for unlocking a brake-locked wheel in which the pressure of a hydropneumatic spring means 3, 4 is used for holding a valve in a brake conduit open, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint or prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Apparatus for unlocking a brake-locked wheel comprising
   at least one wheel means;
   brake means for said wheel means including a brake having a brake cylinder, a brake fluid supply conduit connected with said brake cylinder so that locking of said wheel means by said brake means may occur; a car body;
   hydropneumatic spring means supporting said car body on said wheel means and including a fluid filled spring chamber;
   a source of pressure fluid with a pressure conduit means; discharge means;
   a level regulating valve means having first and second positions for connecting said spring chamber with said pressure conduit means and with said discharge means, respectively, depending on the relative displacement of said car body and said wheel means;

unlocking means including an unlocking cylinder, an unlocking piston in said unlocking cylinder forming an unlocking chamber, and an unlocking valve located in said supply conduit and being opened and closed by said unlocking piston;

a control conduit connecting said spring chamber with said unlocking chamber;

sensor means for sensing a condition of said wheel means locked by said brake means; and control valve means in said control conduit having a normal open position connecting said fluid filled spring chamber with said unlocking chamber so that said unlocking piston holds said unlocking valve open even when said source fails, and being shifted under the control of said sensor means sensing a locked condition of said wheel means to another position connecting said unlocking chamber with said discharge means so that said unlocking piston moves said unlocking valve means to close said supply conduit while said unlocking piston draws fluid out of said brake cylinder whereby said wheel means is unlocked.

2. Apparatus as claimed in claim 1, wherein said sensor means is electric and produces a signal when said wheel is locked; and wherein said control valve means are electromagnetic valve means including a winding receiving said signal.

3. Apparatus as claimed in claim 1, wherein said control conduit is connected with said discharge means through said control valve means; wherein said spring chamber is connected with said discharge means through said level regulating valve.

4. Apparatus as claimed in claim 1, wherein said discharge means is one open container.

5. Apparatus as claimed in claim 4, wherein said source is the only source of pressure fluid, and said open container is the only discharge container in the apparatus.

6. Apparatus as claimed in claim 1, wherein said source includes a pump and an accumulator for pressure fluid.

7. Apparatus as claimed in claim 1, wherein said wheel means include two wheels and a shaft connecting said wheels coaxially; and wherein said hydropneumatic spring means is mounted on said sahft.

8. Apparatus as claimed in claim 1, comprising two said wheel means and a shaft connecting said wheel means; two said breke means with two said supply conduits; two said hydropneumatic spring means mounting said car body on said shaft, two said control conduits, two sensor means and two control valve means; and only one source of pressure fluid, one pressure conduit means, one discharge means, and one level regulating valve means.

9. Apparatus as claimed in claim 8, wherein said level regulating valve means selectively connects both said spring means with said pressure conduit means and said discharge means, respectively, in said first and second positions, respectively.

10. Apparatus as claimed in claim 9, including a master brake cylinder and piston means with operator controlled means, said master brake cylinder communicating with said two brake fluid supply conduits for supplying brake fluid to said brake cylinders of said two brake means.

* * * * *